United States Patent [19]

Matsuyama et al.

[11] Patent Number: 4,656,509
[45] Date of Patent: Apr. 7, 1987

[54] WATER LEAKAGE MONITORING SYSTEM

[75] Inventors: Isamu Matsuyama, Kobe; Hiroshi Sugimoto, Toyonaka, both of Japan

[73] Assignee: Mitsubishi Denki Kabushiki Kaisha, Tokyo, Japan

[21] Appl. No.: 642,596

[22] Filed: Aug. 20, 1984

[30] Foreign Application Priority Data

Aug. 19, 1983 [JP] Japan .................................. 58-151913

[51] Int. Cl.$^4$ ............................................. H04N 7/18
[52] U.S. Cl. .................................. 358/100; 165/11.2; 376/250
[58] Field of Search ................. 358/93, 100, 229, 210; 165/11 A; 137/559; 376/250

[56] References Cited

U.S. PATENT DOCUMENTS 4,503,506 3/1985 Sturges .................................. 358/100

FOREIGN PATENT DOCUMENTS 50-133393 10/1975 Japan .
58-31856 7/1983 Japan .

Primary Examiner—Howard W. Britton
Attorney, Agent, or Firm—Wenderoth, Lind & Ponack

[57] ABSTRACT

A water leakage monitoring system has a carriage remotely controlled with a driving control signal to intermittently travel along an inspection rail, a plurality of discrete monitored members disposed adjacent to the inspection rail, an industrial color television camera hung from the carriage through an attitude adjusting mechanism so as to correctly oppose and monitor water leakage through each of the monitored members through the operation of the attitude adjusting mechanism in response to an attitude control signal, and a coating composition applied to the surface of each of the monitored members which changes in color when it is wet with water leaked through the associated monitored member.

4 Claims, 2 Drawing Figures

WATER LEAKAGE MONITORING SYSTEM

BACKGROUND OF THE INVENTION

This invention relates to a remote water leakage monitoring system for monitoring the operation status of a plant by remotely detecting leakages of water from members and/or equipment disposed in the plant.

Previously, a patrol person has patroled a plant to visually monitor leakages of water from monitored members and equipment such as piping, valves, pumps etc. disposed in the plant and determine whether or not they are abnormal by comparing with the normal statuses thereof followed by the recording of the determined statuses. At that time, it might be difficult to determine whether water attached to the piping or the like results from water leaked therefrom or water externally attached thereto. Also it has been normally difficult to visually confirm a very small amount of leaked water.

Since the leakage of water has been previously monitored by patrol persons as described above, it has not be avoided to overlook leakages of water and/or erroneously record them.

Particularly, patrol persons cannot readily enter places where a danger of exposure to radiation exists, such as nuclear reactor containments. Thus, the visual monitoring as described above has been difficult to be carried out in such places.

Accordingly, it is an object of the present invention to provide a new and improved water leakage monitoring system for remotely monitoring leakages of water from monitored members and equipment disposed in a plant in easy manner.

SUMMARY OF THE INVENTION

This invention provides a water leakage monitoring system comprising an inspection route running so as to discretely put a plurality of monitored members adjacent to at least one side thereof, a remotely controlled carriage controlled with a driving control signal to intermittently travel along the inspection route, an attitude adjusting mechanism disposed on the remotely controlled carriage, a color television camera equipped on the attitude adjusting mechanism, the attitude adjusting mechanism being responsive to an attitude control signal to change an attitude of the television camera relative to each of the monitored members so as to monitor a water leakage through a now opposing one of the monitored member, and a coating composition applied to one part of the surface of each of the monitored members, the coating composition reacting on water leaked through the associated member to change in color.

BRIEF DESCRIPTION OF THE DRAWING

The present invention will become more readily apparent from the following detailed description taken in conjunction with the accompanying drawing in which.

DESCRIPTION OF THE PREFERRED EMBODIMENT

Figure 1:
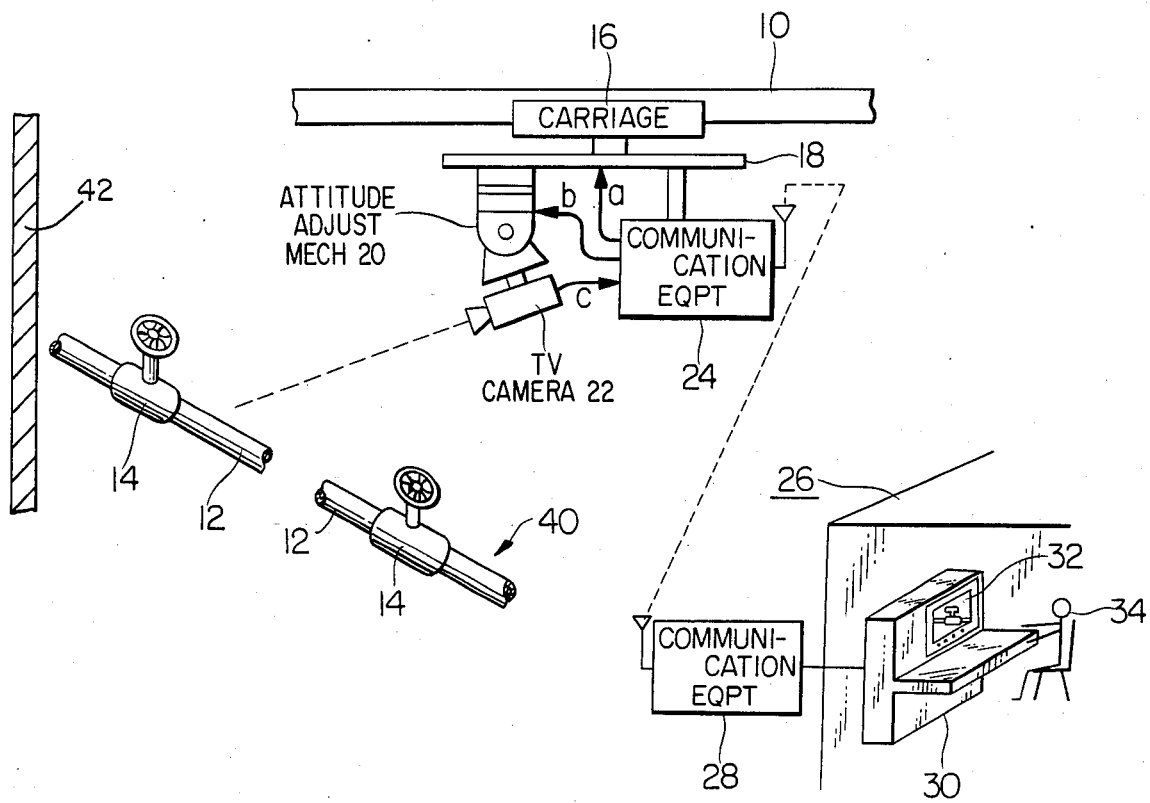
FIG. 1 is a schematic plan view of one embodiment according to the water leakage monitoring system of the present invention with some parts illustrated in perspective and with some parts omitted.

Referring now to FIG. 1 of the drawing, there is illustrated one embodiment according to the water leakage monitoring system of the present invention. The arrangement illustrated comprises a rail 10 laid along an inspection route (not shown) running so as to discretely put a plurality of monitored members of a primary cooling system 40 a nuclear reactor containment 42 adjacent to at least one side of the rail 10. Examples of the monitored members involve piping, valves, pumps etc. and one part of a pipe 12 and valves 14 connected to the pipe 12 are shown as being located adjacent to the rail 10. The arrangement comprises further a remotely controlled carriage 16 hanging from the rail 10 for intermittent movement along the latter and supporting a mounting base 18 so as to be substantially parallel to the plane in which the rail 10 runs. Disposed on the lower, lefthand side as viewed in FIG. 1 of the mounting base 18 is an attitude adjusting mechanism 20 which, in turn, includes a lower end connected to a color television camera 22 so as to permit both an angle to the horizon or an elevation, in this case, a dip and an angle to a reference vertical or an azimuth of the optical axis of the television camera 22 to change. In other words, the attitude adjusting mechanism 20 hangs the television camera 8 so as to be swung vertically and laterally. The color television camera 22 is preferably an industrial color television camera. Also the mounting plate 18 has communication equipment 24 hung down from the lower righthand side thereof as viewed in FIG. 1. The communication equipment 24 is shown in FIG. 1 as being of a radio type.

As shown on the lower righthand portion in FIG. 1, the arrangement comprises further a control compartment generally designated by the reference numeral 26, other radio type communication equipment 28 located on the outside of the control compartment 26 to transmit and receive signals between the same and the communication equipment 24 equipped on the carriage 16, a control board 30 disposed within the control compartment 26 and including a color television receiver 32. The control board 30 and the color television receiver 32 are electrically connected to the communication equipment 24 equipped on the carriage 16 through the communication equipment 28.

Thus a scene seen by the color television camera 22 can be imaged on the color television receiver 32.

While observing the color television receiver 32, the operator 34 operates the control board 30 to apply a driving control signal to the carriage 16 through the communication equipment 28 and 24. This results in the carriage 16 being moved along the rail 10. When the carriage 16 reaches one of the inspected points as determined by observing the television receiver 32, the operator 34 operates the control board 30 to stop the driving control signal a. This results in the stoppage of the carriage 16 at the one inspected point.

Then the operator 34 operates the control board 30 to apply an attitude control signal b to the attitutde adjusting mechanism 20 through the communication equipment 28 and 24. The attitude adjusting mechanism 20 responds to the attitude control signal b to change the attitude of the television camera 22 relative to an adjacent monitored member, in this case, one of the valves 14.

On the other hand, the television camera 22 transmits a video signal c originating from the valve 14 and the surroundings to the television receiver 32 through the communication equipment 24 and 28 and the control board 30. Thus, the operator 34 can observe an image of the valve 14 and the surroundings shown on the television receiver 32.

When the television camera 22 correctly opposes the valve 14 as determined by the operator 34, through the observation of the image on the television receiver 32, the operator 34 operates the control board 30 to stop the attitude control signal b. Thus, the television camera 22 is maintained in an attitude thus determined.

Therefore, the operator 34 can well observe the image on the television receiver 32 to determine if water leaks through the valve 14 followed by the recording of the present status of the valve 14.

Subsequently, the process as described above is repeated to successively stop the carriage 16 at the remaining inspected positions and successively monitor those members disposed respectively at such positions be required to be inspected.

Accordingly, the operator can correctly observe the operation status of the monitored plant and make it possible to detect a water leakage or leakages in its or their early stage.

In order to further facilitate the detection of the water leaking portion of a monitored member by rendering the water leaking portion itself remarkably visible, the present invention also provides a monitored member or equipment provided on that surface portion on which a water leak occurs with a coating composition which is wet with water to change in color.

Figure 2:
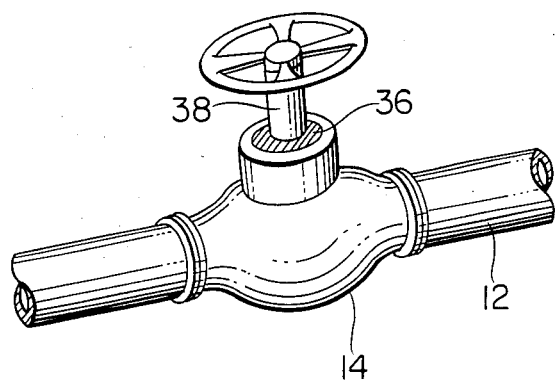
FIG. 2 is a perspective view illustrating, by way of example, a coating composition coated on one of monitored member, in this case, the valve shown in FIG. 1.

FIG. 2 shows one example of a monitored member according to the present invention. The arrangement illustrated comprises a valve 14 connected in a pipe 12 leading, for example, to a nuclear reactor containment (not shown). As shown in FIG. 2, a conventional coating composition 36 is applied to a circular surface portion beyond which a valve stem 38 centrally protrudes in a water-proof relationship. In the example illustrated, the coating composition 36 is a conventional composition formed of a chemical selected so as to be wet with acidic water to change in color for the following reason.

The primary reactor cooling water has generally boric acid dissolved thereinto and adjusts an output from an associated nuclear reactor by adjusting a concentration of the boric acid dissolved in the cooling water thereby to control a nuclear fission rate. Thus, the primary cooling water is acidic due to the boric acid.

Under these circumstances, when the acidic cooling water leaks through a clearance around the valve stem 38 to reach the coating composition 36, the latter changes in color.

When the arrangement of FIG. 2 is disposed at a position illustrated by the valve 14 the pipe 12 in FIG. 1, the operator can readily determine if water leakage occurs on the valve 14. More specifically, while observing the television receiver 32, the operator 34 operates the control boards 330 as described above and can determine the occurrence of water leakage on the valve 14 when the coating composition 36 imaged on the color television receiver 32 changes in color. Otherwise the valve 14 is sound.

From the foregoing, it is seen that, according to the present invention, an industrial television camera along with an attitude adjusting mechanism therefor is equipped on a remotely controlled carriage arranged to travel along an inspected route, on the one hand and a plurality of monitored members or equipment are discretely disposed adjacent to the inspected route and each of the surfaces thereof is partly applied with a coating composition which is wet with water to change in color, on the other hand, whereby the plurality of monitored members or equipment can be remotely monitored for water leakage. Therefore, the present invention securely monitors the water leakage even in undesirable environments into which any human being cannot readily enter, for example, in a nuclear reactor containment and without the necessity of disposing a multitude of industrial television cameras in such an environment.

While the present invention has been illustrated and described in conjunction with a single preferred embodiment thereof, it is to be understood that numerous changes and modifications may be resorted to without departing from the spirit and scope of the present invention. For example, while a driving mechanism for the carriage 16 is not illustrated or described, it is to be understood that the carriage itself may be equipped with a driving mechanism such as an electric motor to be made into an automatic type. Alternatively, the carriage may be of an external drive type. In the latter case, the carriage is connected to an endless chain or the like extending along the rail and coupled to a driving device disposed at one end of the rail. Also, while the communication equipment 24 and 28 is shown as being of the radio type, it is to be understood that both the communication equipment devices may be connected to each other by hard wire.

Moreover, while the coating composition has been described as changing in color when contacted by boric acid, it is to be understood that the present invention is not restricted thereby or thereto and that the same is equally applicable to the use of coating compositions responsive to any acidic, basic or neutral water to change in color. Also the coating composition may be a paint responsive to a temperature to change in color as the case may be. Alternatively, each of the monitored members may be partly covered with a piece of cloth which becomes blackish when wet with water.

Also, while the present invention has been illustrated and discribed in conjunction with the manually remote controlled water leakage monitoring system it is to be understood that the same is equally applicable to automatically remote controlled systems. In the latter case, a plurality of places to be monitored are predetermined and standard color patterns for those places are stored in a memory involved. Then, a carriage including the attitude adjusting mechanism, the industrial color television camera and others is arranged to automatically travel along a predetermined route while monitoring the statuses of the monitored places to compare changed colors in those places with the standard color patterns. The results of the comparisons give automatic diagnoses. Moreover, the carriage may travel along a predetermined route disposed on a floor of a monitored plant.

What is claimed is:

1. A water leakage monitoring system, comprising: a plurality of discrete monitored members located along and adjacent to at least one side of a longitudinally extending inspection route, a carriage, means for remotely controlling said carriage with a driving control signal to intermittently travel along said inspection route adjacent to each monitored member, an attitude adjusting mechanism disposed on said carriage, a color television camera on said attitude adjusting mechanism, means for controlling attitude adjusting mechanism with an attitude control signal to change an attitude of said television camera relative to each of said monitored members so as to oppose each monitored member when said carriage is adjacent thereto, so as to successively monitor water leakage through each of said monitored members when said television camera is opposed thereto, and a coating composition applied to an exposed part of the surface of each of said monitored members, said coating composition being reactive with water leaked through the associated monitored member to change in color.

2. A water leakage monitoring system as claimed in claim 1, wherein said color television camera is an industrial color television camera.

3. A water leakage monitoring system as claimed in claim 1, wherein each of said plurality of monitoring members is connected in a primary cooling piping system for a nuclear reactor containment.

4. A water leakage monitoring system as claimed in claim 2, wherein each of said plurality of monitoring members is connected in a primary cooling piping system for a nuclear reactor containment.

* * * * *